(12) United States Patent
Machida et al.

(10) Patent No.: US 7,102,115 B2
(45) Date of Patent: Sep. 5, 2006

(54) PHOTOELECTRIC CONVERTER AND A METHOD OF DRIVING THE SAME

(75) Inventors: Satoshi Machida, Chiba (JP); Yukito Kawahara, Chiba (JP)

(73) Assignee: Seiko Instruments Inc., (JP)

( * ) Notice: Subject to any disclaimer, the term of this patent is extended or adjusted under 35 U.S.C. 154(b) by 0 days.

(21) Appl. No.: 10/784,419

(22) Filed: Feb. 23, 2004

(65) Prior Publication Data

US 2005/0035273 A1 Feb. 17, 2005

(30) Foreign Application Priority Data

| Feb. 26, 2003 | (JP) | ............................. 2003-048592 |
| Feb. 26, 2003 | (JP) | ............................. 2003-049572 |
| Dec. 8, 2004 | (JP) | ............................. 2004-019667 |

(51) Int. Cl.
*H01L 27/00* (2006.01)
*H04N 3/14* (2006.01)

(52) U.S. Cl. ................ 250/208.1; 348/308; 250/214 A

(58) Field of Classification Search ............ 250/208.1, 250/214 R, 214 A, 214 LA, 214 LS, 214 SW; 348/300, 301, 303, 304, 308, 297
See application file for complete search history.

(56) References Cited

U.S. PATENT DOCUMENTS

2002/0166949 A1 * 11/2002 Machida ................... 250/208.1

\* cited by examiner

*Primary Examiner*—Kevin Pyo
(74) *Attorney, Agent, or Firm*—Adams & Wilks

(57) ABSTRACT

A photoelectric converter capable of reducing random noise comprises a photoelectric conversion circuit for generating an optical signal in correspondence to incident light, a reset circuit connected to an output terminal of the photoelectric conversion circuit, and an amplification circuit connected to output terminals of the photoelectric conversion circuit and the reset circuit. An electric charge transfer unit has one terminal connected to an output terminal of the amplification circuit and another terminal connected to a capacitor. A source follower amplifier has a gate connected to the electric charge transfer unit and the capacitor, and a channel selection circuit is connected to a source of the source follower amplifier. A common signal line is connected to an output terminal of the channel selection circuit, a first current source is connected to the common signal line, and a second current source is connected to the source of the source follower.

5 Claims, 12 Drawing Sheets

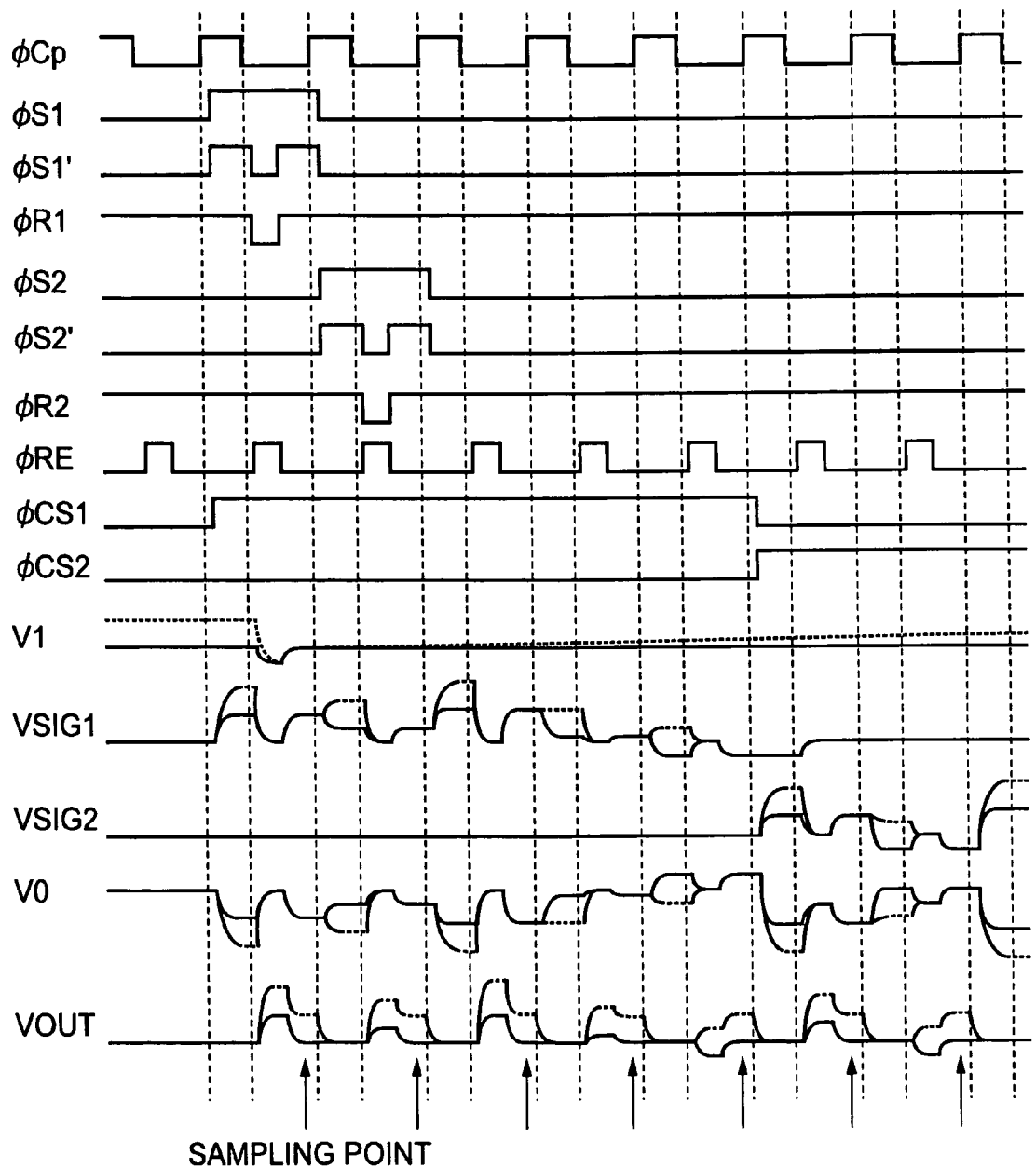

PHOTOELECTRIC CONVERTER AND A METHOD OF DRIVING THE SAME

BACKGROUND OF THE INVENTION

1. Field of the Invention

The present invention relates to a photoelectric converter that receives a light reflected from an original to which the light is irradiated, and converts the light into an electric signal, and more specifically to a linear image sensor suitable for an image reading device such as a facsimile or an image scanner.

2. Description of the Related Art

FIG. 16 shows a circuit diagram of an image sensor IC used in a conventional image reading device, and FIG. 17 shows a timing chart. (For example see JP 11-239245 A (pages 2 through 5, FIG. 1)).

An N-type region of a photodiode 101 is connected to a positive supply voltage terminal VDD, and a P-type region is connected to a drain of a reset switch 102 and a gate of a source follower amplifier 103. A source of the reset switch 102 is supplied with a reference voltage VREF1. A source of the output terminal of the source follower amplifier 103 is connected to a read switch 105 and a constant current source 104. A gate of the constant current source 104 is supplied with a constant voltage of a reference voltage VREFA. A photoelectric conversion block An shown in FIG. 16 shows a photoelectric conversion block of an n-th bit. The number of photoelectric conversion blocks is identical to the number of pixels, and the photoelectric conversion blocks are connected to a common signal line 106 through the respective read switches 105.

The common signal line 106 is inputted to an inverse terminal of an operational amplifier 109 through a resistor 110, and an output terminal of the operational amplifier 109 is connected to an output terminal 116 through a chip select switch 112 and a capacitor 113. The common signal line 106 is connected to a signal line reset switch 107, and a source of the signal line reset switch 107 is given a reference voltage VREF2. A resistor 111 is connected between the output terminal and the inverse terminal of the operational amplifier 109, and a non-inverse terminal of the operational amplifier 109 is fixed to a constant voltage VREF3. An inverse amplifier D is composed of the operational amplifier 109, the resistor 110 and the resistor 111.

An output terminal 116 of the image sensor is connected to a drain of the MOS transistor 114, and a source of the MOS transistor 114 is given a reference voltage VREF4. Further, the output terminal 116 of the image sensor is also connected to a capacitor 115 such as a parasitic capacitor. A clamp circuit C is composed of the capacitor 113, the capacitor 115 and the MOS transistor 114.

However, in the image sensor of the above type, the photodiode is reset after an optical signal is read subsequent to the completion of photocharge storage, and thereafter the reference signal is read, and a difference between the optical signal and the reference signal is taken. This leads to such a problem that reset noises put on the reference signal and the optical signal are different from each other. That is, because the reset noises of the different timings are compared with each other, there arises a problem in that the random noises are large.

SUMMARY OF THE INVENTION

In order to solve the above-mentioned problems associated with the prior art, according to the present invention, there are provided a photoelectric converter which is constituted as follows, and a method of driving the same.

As for a sequential type photoelectric converter, there is provided a photoelectric converter including: a photoelectric conversion unit; a reset unit connected to an output terminal of the photoelectric conversion unit; an amplification unit connected to the photoelectric conversion unit and the reset unit; an electric charge transfer unit and a capacitor serving as a hold unit and connected to an output terminal of the amplification unit; a source follower amplifier and a channel selection unit serving as a signal read unit for, in response to an output signal of the hold unit, outputting a signal; and a common signal line to which the signal read unit is connected, wherein the hold unit holds a reference signal generated through resetting of the photoelectric conversion unit by the reset unit.

With the above-mentioned configuration, the channel selection unit is turned ON to output the reference signal to the common signal line, and then the electric charge transfer unit is turned ON to read out an optical signal to the common signal line.

Further, according to the photoelectric converter of the present invention: a first current source is connected to the common signal line, and a second current source is connected to a source of the source follower amplifier; while the channel selection means is held in an ON state, the first current source is turned ON to cause a current to flow; and when the electric charge transfer means is turned ON to read out the reference signal to the capacitor, the second current source is turned ON to cause a current to flow. At this time, there is employed a configuration in which the current caused to flow through the second current source is substantially the same as that caused to flow through the first current source.

Furthermore, as for a batch type photoelectric converter, there is provided a photoelectric converter including: a photoelectric conversion unit; a reset unit connected to an output terminal of the photoelectric conversion unit; a first amplification unit connected to output terminals of the photoelectric conversion unit and the reset unit; a first electric charge transfer unit and a first capacitor serving as a first hold unit and connected to an output terminal of the first amplification unit; a second amplification unit connected to the first hold unit; a second electric charge transfer unit and a second capacitor serving as a second hold unit connected to the second amplification unit; a third amplification unit connected to the second hold unit; a third electric charge transfer unit and a third capacitor serving as a third hold unit connected to the third amplification unit; and a source follower amplifier and a channel selection unit serving as a signal read unit connected to the third hold unit, wherein the third capacitor holds a reference signal generated through resetting of the photoelectric conversion unit by the reset unit, and the first capacity and the second capacity hold a reference signal and an optical signal in order.

Further, according to the photoelectric converter of the present invention: when the channel selection means is turned ON, the reference signal is read out from the third capacitor to the common signal line, and the third electric charge transfer means is turned ON to read out the optical signal from the second capacitor to the common signal line; after the reference signal and the optical signal are read out to the common signal line, the channel selection means is turned OFF; and the reference signal held by the first capacitor is read out to the third capacitor.

Further, according to the photoelectric converter of the present invention: a first current source is connected to the common signal line, and a second current source is connected to a source of the source follower amplifier; while the channel selection means is held in an ON state, the first current source is turned ON to cause a current to flow; and when the electric charge transfer means is turned ON to read out the reference signal to the third capacitor, the second current source is turned ON to cause a current to flow. At this time, there is employed a configuration in which the current caused to flow through the second current source is substantially the same as that caused to flow through the first current source.

According to the photoelectric converter and the method of driving the same, the reference signal and the optical signal containing therein the same off-noise of a reset switch can be read out in order. Thus, if a difference in voltage between these signals is taken by utilizing a method such as a correlation dual sampling method, then it is possible to obtain the photoelectric converter small in fixed pattern noise and random noise.

Consequently, it becomes possible to supply an image sensor IC having a simple configuration and a small fluctuation in dark outputs. Moreover, it is possible to provide a highly accurate close contact type image sensor in which a plurality of image sensor ICs are linearly mounted.

BRIEF DESCRIPTION OF THE DRAWINGS

In the accompanying drawings:

FIG. 17 is a timing chart of the image sensor IC for use in the conventional image reading device.

DETAILED DESCRIPTION OF THE PREFERRED EMBODIMENTS

First Embodiment

Figure 1:
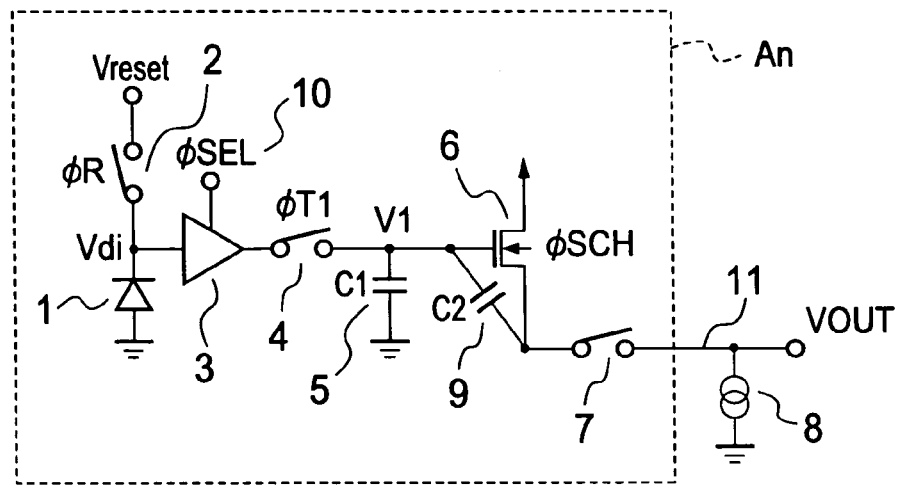
FIG. 1 is a schematic circuit diagram of a sequential type photoelectric converter according to a first embodiment of the present invention.

FIG. 1 is a schematic circuit diagram of a sequential type photoelectric converter according to a first embodiment of the present invention. The sequential type photoelectric converter means a photoelectric converter for carrying out reset of electric charges and storage of photocharges in an output of each photodiode of an image sensor in parallel with each other while shifting a timing.

Figure 7:
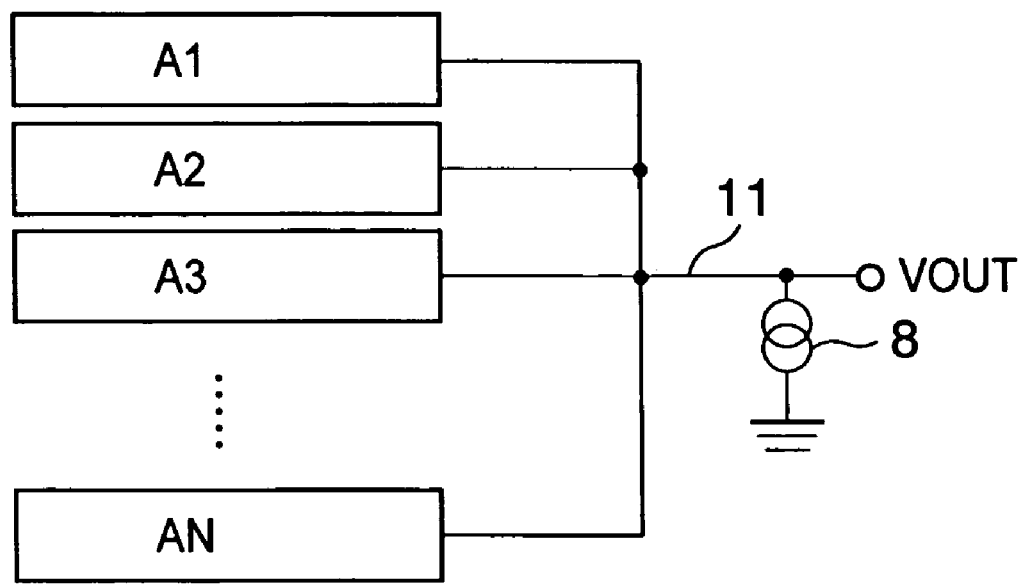
FIG. 7 is a circuit diagram, partly in block diagram, of a configuration of a whole photoelectric converter according to the present invention.

A photoelectric conversion block An shows a photoelectric conversion block of an n-th bit. The number of photoelectric conversion blocks is identical to the number of pixels, and the photoelectric conversion blocks are connected to a common signal line 11 through the respective channel selection switches 7. A configuration of a whole photoelectric converter is shown in FIG. 7.

A circuit of this embodiment includes: a photodiode 1 serving as a photoelectric conversion unit; a reset switch 2 serving as a reset unit; an amplification unit 3; a transfer switch 4 serving as an electric charge transfer unit; a capacitor 5; a MOS transistor 6 constituting a MOS source follower; the channel selection switch 7 serving as a channel selection unit; the common signal line 11; and a first current source 8.

The amplification unit 3 may be constituted by a MOS source follower, a voltage follower amplifier or the like and may also be provided with an amplifier enable terminal 10 through which an operation state is selected. In addition, a parasitic capacitor 9 exists between a gate and a source of the MOS transistor 6.

Figure 2:
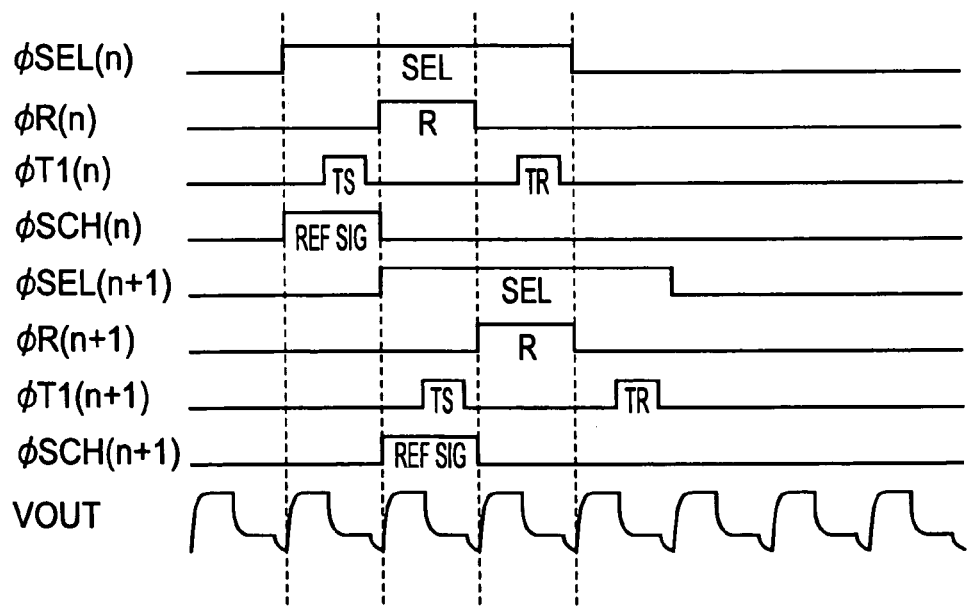
FIG. 2 is a timing chart corresponding to the schematic circuit diagram of the sequential type photoelectric converter according to the first embodiment of the present invention.

FIG. 2 is a timing chart corresponding to the schematic circuit diagram of the sequential type photoelectric converter according to the first embodiment of the present invention.

At the time when the reset switch 2 is turned ON in accordance with ΦR(n), a voltage appearing at an output terminal Vdi of the photodiode 1 is fixed to a reference voltage Vreset. On the other hand, at the time when the reset switch 2 is turned OFF in accordance with ΦR(n), the voltage appearing at the output terminal Vdi takes a value obtained by adding an off-noise to the reference voltage Vreset. The off-noise becomes a random noise since an electric potential becomes unstable whenever the reset is carried out. Consequently, in order to prevent the random noise from occurring, it is only necessary to take a difference between an output voltage of the amplifier 3 after the reset and an output voltage of the amplifier 3 after the photodiodes subsequently accumulate photocharges.

Thus, as shown in FIG. 2, after the reset switch 2 is turned OFF in accordance with ΦR(n), the transfer switch 4 is turned ON in accordance with ΦT1(n) to read out the reference signal to the capacitor 5 for a time interval TR. The reference signal is held in the capacitor 5 for one period. For this time interval, the photocharges are accumulated in the photodiode 1, and the electric potential appearing at the output terminal Vdi fluctuates in correspondence to a quantity of photocharges. At the time when the channel selection switch 7 is turned ON in accordance with ΦSCH(n) of the next period, the reference signal held in the capacity 5 is read out to the common signal line 11 for a time interval REF. Next, if ΦT1(n) is turned ON to read out an optical signal corresponding to a quantity of electric charges accumulated in the photodiode 1 to the capacitor 5 for a time interval TS, then this optical signal is read out to the common signal line 11. If ΦT1(n) is turned ON, then the optical signal is accumulated in the capacitor 5. However, if for the time interval TS when ΦT1(n) is held in an ON state, a drivability of the amplification unit 3 is set so that settling for an electric potential appearing at a terminal V1 is obtained, then a time interval when ΦSCH(n) is held in an ON state can be shortened to allow a high speed operation to be carried out.

From the operation as described above, if there is taken a difference between the output voltage VOUT on the common signal line 11 for a time interval REF of ΦSCH(n) and the output voltage VOUT on the common signal line 11 for a time interval SIG of ΦSCH(n), then it is possible to remove the fixed pattern noise and the random noise caused by the reset switch 2.

After ΦT1(n) is turned OFF, ΦSCH(n) is turned OFF, and ΦR(n) is turned ON to carry out the next reset of the photodiode 1. Then, ΦT1(n) is turned ON again to read out the reference signal to the capacitor 5 for a time interval TR.

After ΦSCH(n) is turned OFF, the channel selection switch 7 of the next bit is turned ON in accordance with ΦSCH(n+1) to start an operation for reading out a reference signal of the next bit. All the other pulses of an (n+1)-th bit are shifted backwardly from the pulses of an n-th bit by a time interval when ΦSCH is held in an ON state. A time interval for the storage of each light receiving element ranges from a time point when ΦR(n) is turned OFF up to a time point of completion of the time interval TS of ΦT1(n) of the next period. Thus, this time interval will also be shifted depending on bits.

Figure 16:
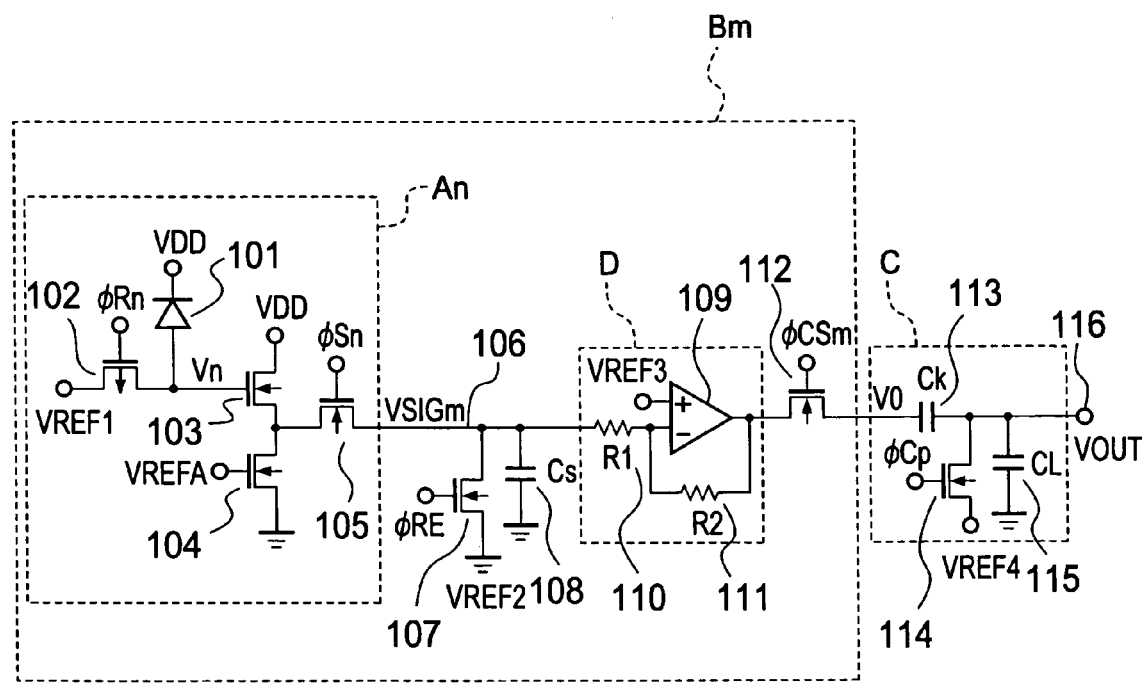
FIG. 16 is a circuit diagram of an image sensor IC for use in a conventional image reading device.

A difference between the reference signal and the optical signal which have been read out is taken in a correlation dual sampling circuit or the like. This process, for example, can be carried out using a circuit of a block C of a prior art example shown in FIG. 16.

Second Embodiment

Figure 3:
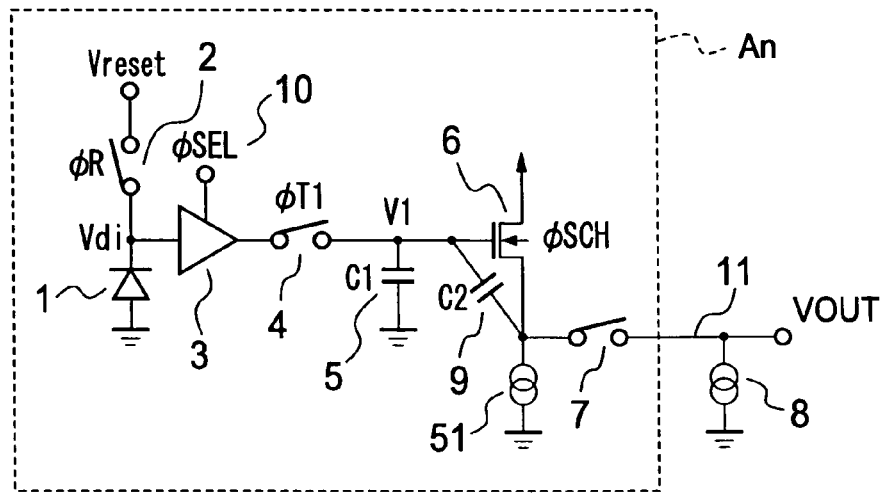
FIG. 3 is a schematic circuit diagram of a sequential type photoelectric converter according to a second embodiment of the present invention.

FIG. 3 is a schematic circuit diagram of a sequential type photoelectric converter according to a second embodiment of the present invention. A point of difference in configuration from FIG. 1 is that a second current source 51 is connected to a source of the MOS transistor 6. The second current source 51 is designed so that it is turned ON and OFF in accordance with an enable signal ΦRR, and while the second current source 51 is held in an ON state, a current which is substantially the same as that of the first current source 8 is caused to flow through the second current source 51.

Figure 5:
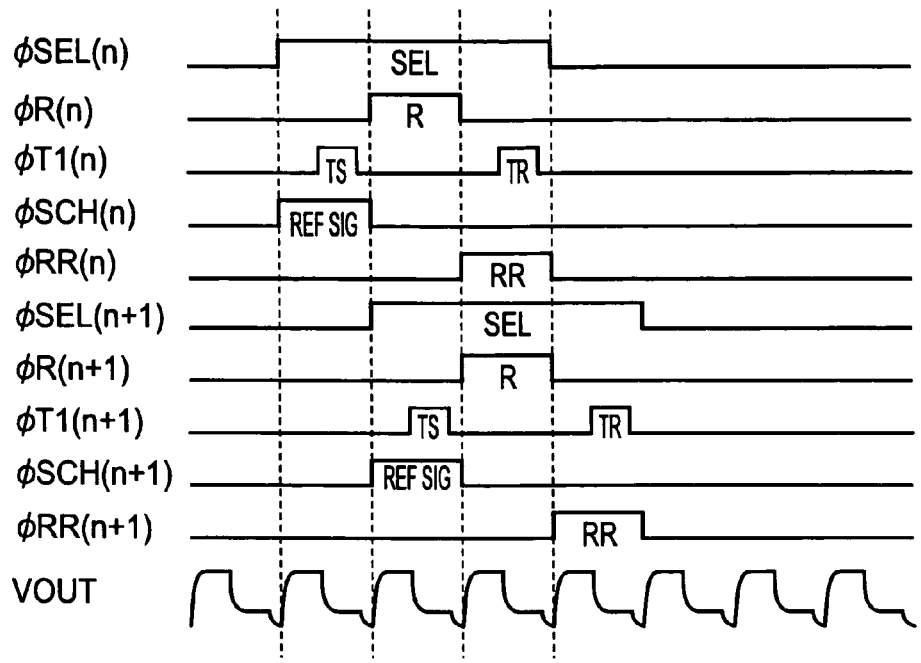
FIG. 5 is a timing chart corresponding to the schematic circuit diagram of the sequential type photoelectric converter according to the second embodiment of the present invention.

FIG. 5 is a timing chart corresponding to the schematic circuit diagram of the sequential type photoelectric converter according to the second embodiment of the present invention.

At the time when the reset switch 2 is turned ON in accordance with ΦR(n), a voltage appearing at an output terminal Vdi of the photodiode 1 is fixed to a reference voltage Vreset. On the other hand, at the time when the reset switch 2 is turned OFF in accordance with ΦR(n), the voltage appearing at the output terminal Vdi takes a value obtained by adding an off-noise to the reference voltage Vreset. The off-noise becomes a random noise since an electric potential becomes unstable whenever the reset is carried out. Consequently, in order to prevent the random noise from occurring, it is only necessary to take a difference between an output voltage of the amplifier 3 after the reset and an output voltage of the amplifier 3 after the photodiodes subsequently accumulate photocharges.

Thus, as shown in FIG. 5, after the reset switch 2 is turned OFF in accordance with ΦR(n), the transfer switch 4 is turned ON in accordance with ΦT1(n) to read out the reference signal to the capacity 5 for a time interval TR. At this time, the second current source 51 is turned ON in accordance with an enable signal ΦRR(n). The reference signal is held in the capacitor 5 for one period. For this time interval, the photocharges are accumulated in the photodiode 1, and the electric potential appearing at the output terminal Vdi fluctuates in correspondence to a quantity of photocharges. At the time when the channel selection switch 7 is turned ON in accordance with ΦSCH(n) of the next period, the reference signal held in the capacitor 5 is read out to the common signal line 11 for a time interval REF. Next, if ΦT1(n) is turned ON to read out an optical signal to the capacitor 5, this optical signal is read out to the common signal line 11.

At this time, the first current source 8 is turned ON, while the second current source 51 is turned OFF. The first current source 8 and the second current source 51 are designed so as to cause substantially the same ONcurrent to flow therethrough. Thus, an electric potential appearing at a source electrode of the MOS transistor 6 when the reference signal is read out to the capacitor 5 for a time interval R1 can be made substantially the same as that when the optical signal is read out to the capacitor 5 for a time interval S1. Consequently, it is possible to reduce an influence of the parasitic capacitor 9 on the electric charges accumulated in the capacitor 5, which results in that an offset of a dark output voltage can be made small.

From the operation as described above, if there is taken a difference between the output voltage VOUT on the common signal line 11 for a time interval REF of ΦSCH(n) and the output voltage VOUT on the common signal line 11 for a time interval SIG of ΦSCH(n), then it is possible to remove the fixed pattern noise and the random noise caused by the reset switch 2. Next, after ΦT1(n) is turned OFF, ΦSCH(n) is turned OFF and ΦR(n) is turned ON to carry out the next reset of the photodiode. Then, ΦT1(n) is turned ON again and the reference signal is read out to the capacitor 5 for the time interval TR.

After ΦSCH(n) is turned OFF, the channel selection switch 7 of the next bit is turned ON in accordance with ΦSCH(n+1) to start an operation for reading out a reference signal of the next bit. All the other pulses of an (n+1)-th bit are shifted backwardly from the pulses of an n-th bit by a time interval when ΦSCH is held in an ON state.

A difference between the reference signal and the optical signal is taken in a correlation dual sampling circuit or the like. This process, for example, can be carried out using a circuit of a block C of the prior art example shown in FIG. 16.

Figure 4:
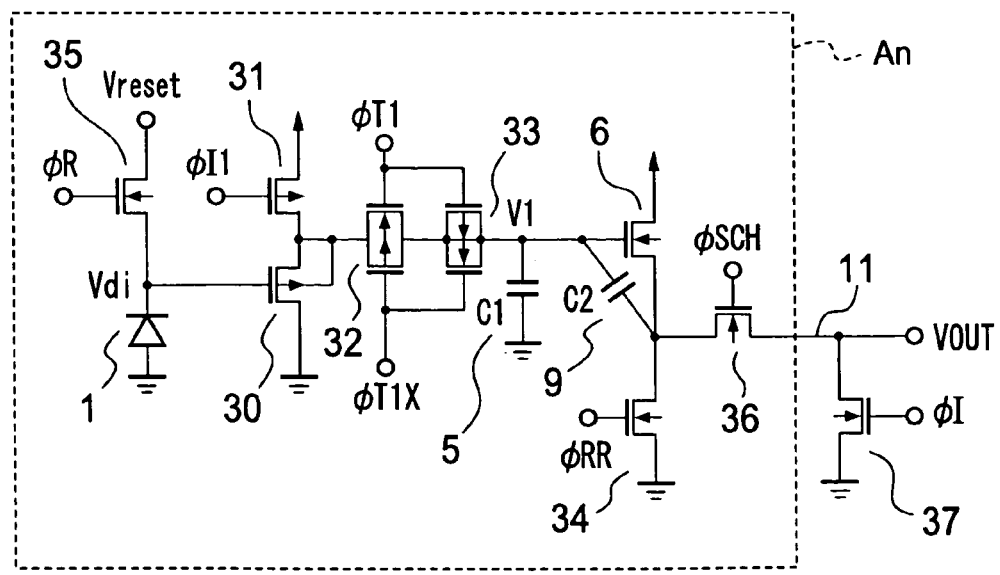
FIG. 4 is a circuit diagram of the sequential type photoelectric converter according to the second embodiment of the present invention.

FIG. 4 is a circuit diagram of the sequential type photoelectric converter according to the second embodiment of the present invention. The reset switch 2, the amplification unit 3, the transfer switch 4, the second current source 51, the channel selection switch 7, and the first current source 8 shown in FIG. 3 are replaced with a MOS switch 35, a MOS source follower 30 and a current source 31, a transmission gate 32 and a dummy switch 33, a MOS current source 34, a MOS switch 36, and a MOS current source 37, respectively. Note that if the MOS current source 34 is removed, the sequential type photoelectric converter according to this embodiment becomes identical in configuration to the sequential type photoelectric converter according to the first embodiment.

Figure 6:
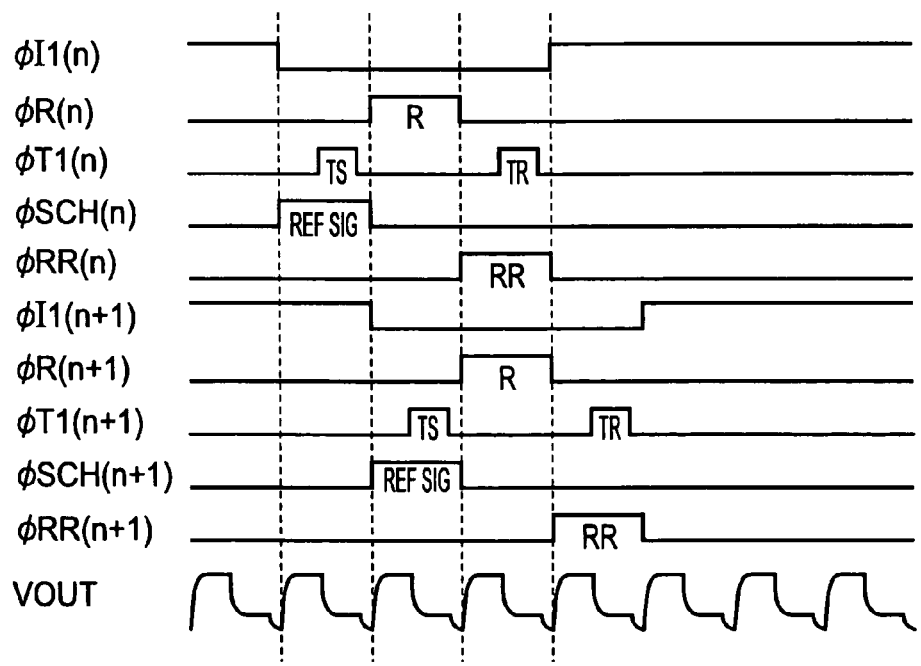
FIG. 6 is a timing chart corresponding to the circuit diagram of the sequential type photoelectric converter according to the second embodiment of the present invention.

FIG. 6 is a timing chart corresponding to the circuit diagram of the sequential type photoelectric converter according to the second embodiment of the present invention. A point of difference from FIG. 5 is that ΦI1 is used instead of ΦSEL. In addition, while not illustrated in FIG. 6, ΦT1X is an inverted signal of ΦT1.

In the circuit of FIG. 4, turning ON and OFF of the amplifier 30 is controlled in accordance with a gate voltage of the current source 31. That is to say, while ΦI1 is equal in level to a power supply voltage, no current is caused to flow and hence the amplifier 30 is held in an OFF state, and while the signal ΦI1 has a suitable voltage lower than the power supply voltage, a current is caused to flow and hence the amplifier 30 is held in an ON state.

Since in the circuit of FIG. 2, a substrate electric potential and a source electric potential of the MOS source follower 30 are made common, a gain can be made nearly 1.

In addition, when the reference signal REF is read out, an electric potential appearing at the terminal V1 and containing the off-noise of ΦT1 is read out. However, when the optical signal SIG is read out, an electric potential appearing at the terminal V1 and containing no off-noise of ΦT1 is read out. For this reason, the off-noise component of ΦT1 becomes a dark output offset. In order to reduce the dark output offset, instead of the transfer switch 4, the transmission gate 32 is used, and the dummy switch 33 is also provided. An NMOS transistor and a PMOS transistor of the transmission gate are made equal in size to each other, and an NMOS transistor and a PMOS transistor of the dummy switch 33 are made half the size of the gate area of the transistors of the transmission gate.

The MOS current source 34 is held in an OFF state while the enable signal ΦRR is equal in level to the GND electric potential, and the MOS current source 34 is held in an ON state while the enable signal ΦRR has a suitable electric potential. The electric potential of the enable signal ΦRR in the ON state is designed so that a current caused to flow through the MOS current source 34 becomes substantially equal to that caused to flow through the MOS current source 37. For the sake of simplicity, when the size of the MOS current source 34 is suitably determined, the electric potential of the enable signal ΦRR in the ON state may also be made equal to the power supply voltage. The above-mentioned case is a specific case where the MOS transistor 6, the MOS current source 34, and the MOS current source 37 are each constituted by an NMOS. However, they may also be constituted by a PMOS.

Third Embodiment

Figure 8:
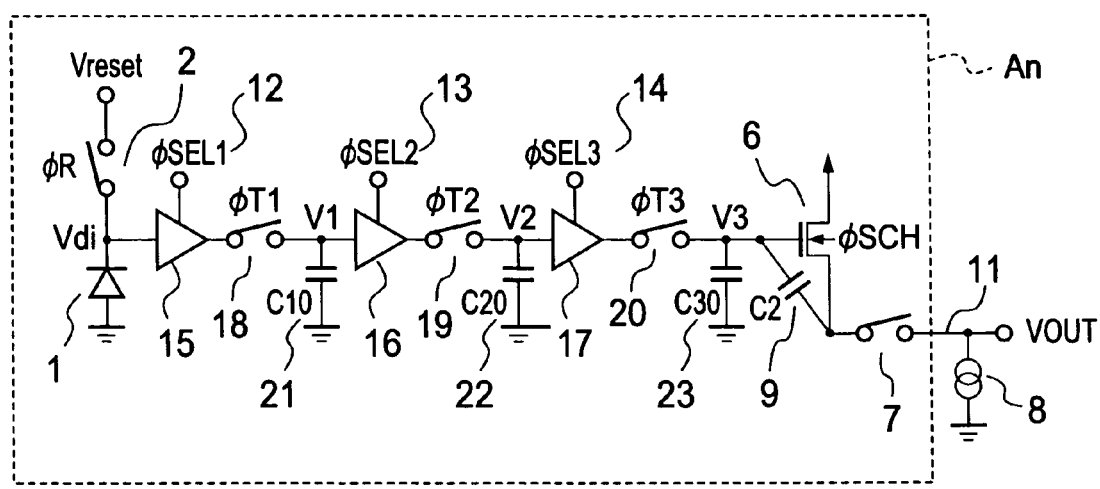
FIG. 8 is a schematic circuit diagram of a batch type photoelectric converter according to a third embodiment of the present invention.

FIG. 8 is a schematic circuit diagram of a batch type photoelectric converter according to a third embodiment of the present invention. The batch type photoelectric converter means a photoelectric converter for carrying out reset of electric charges and storage of photocharges in the output of each photodiode of the image sensor in parallel with each other and at the same timing. A photoelectric conversion block An shows a photoelectric conversion block of an n-th bit. The number of photoelectric conversion blocks is identical to the number of pixels, and the photoelectric conversion blocks are connected to the common signal line 11 through the respective channel selection switches 7. A diagram of a configuration of the whole photoelectric converter is shown in FIG. 7.

The circuit of this embodiment includes: the photodiode 1 serving as a photoelectric conversion unit; transfer switches 18, 19 and 20 each serving as an electric charge transfer unit; a reset switch 2 serving as a reset unit; amplification units 15, 16 and 17; capacitors 21, 22 and 23; the MOS transistor 6 constituting a MOS source follower; the channel selection switch 7 serving as a channel selection unit; the common signal line 11; and the first current source 8. The amplification units 15,16 and 17 maybe each constituted by a MOS source follower, a voltage follower amplifier, or the like, and may also be provided with amplifier enable terminals 12, 13 and 14 for selection of operation states, respectively. In addition, the parasitic capacitor 9 exists between a gate and a source of the MOS transistor 6.

Figure 10:
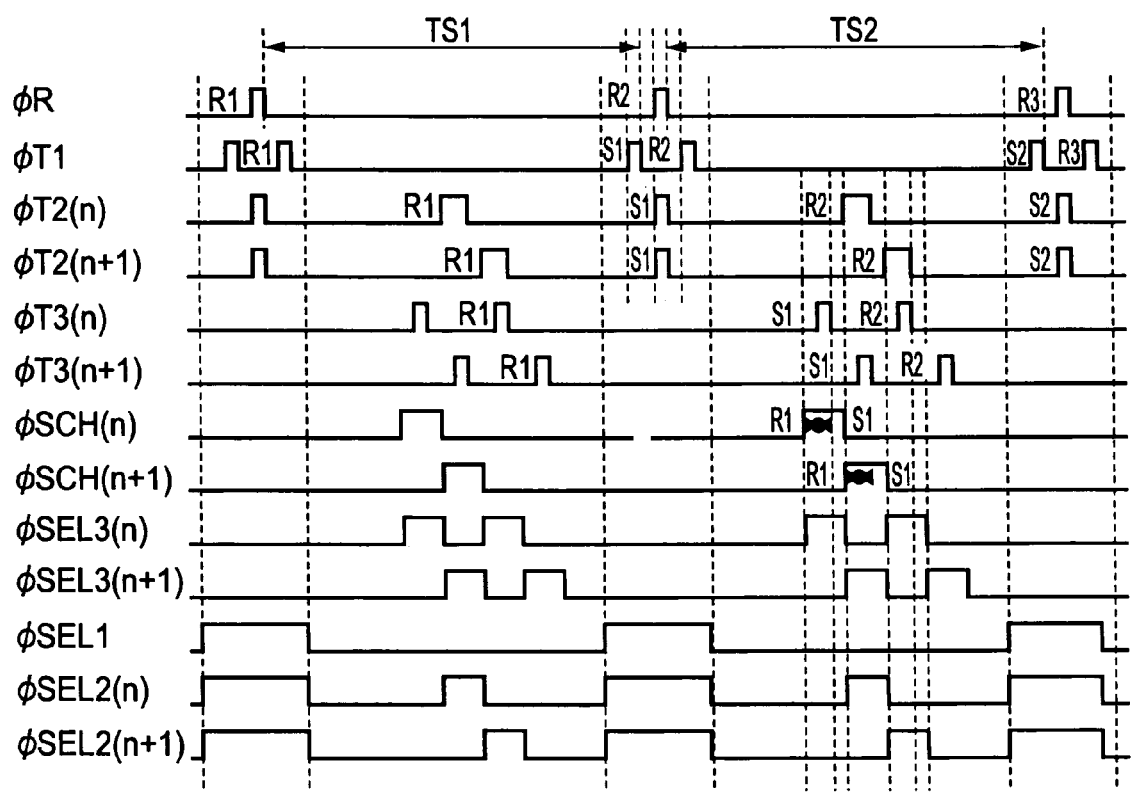
FIG. 10 is a timing chart corresponding to the schematic circuit diagram of the batch type photoelectric converter according to the third embodiment of the present invention.

FIG. 10 is a timing chart corresponding to the schematic circuit diagram of the batch type photoelectric converter according to the third embodiment of the present invention. ΦR, ΦT1 and ΦSEL1 simultaneously operate for all bits. A time interval S1 of ΦT2 when an optical signal is transferred, and a time interval of ΦSEL2 when an optical signal is transferred are also simultaneously for all bits. A time interval R1 of ΦT2 when a reference signal is transferred, a time interval of ΦSEL2 when the reference signal is transferred, and the other pulses are different in operation timing depending on bits. Thus, these signals are denoted with an additional "(n)".

First of all, an operation for transferring the reference signal in the photoelectric conversion block of an n-th bit will hereinafter be described.

At the time when the reset switch 2 is turned ON in accordance with a pulse R1 of ΦR, a voltage appearing at an output terminal Vdi of the photodiode 1 is fixed to a reference voltage Vreset. On the other hand, at the time when the reset switch 2 is turned OFF in accordance with ΦR, the voltage appearing at the output terminal Vdi takes a value obtained by adding an off-noise to the reference voltage Vreset. The off-noise becomes a random noise since an electric potential becomes unstable whenever the reset is carried out. In order to remove an influence of the random noise, it is only necessary to take a difference between an output voltage of the first amplifier 15 after the reset and an output voltage of the first amplifier 15 after the photodiodes subsequently accumulate photocharges.

Then, as shown in FIG. 10, after the reset switch 2 is turned OFF, the first transfer switch 18 is turned ON in accordance with the pulse R1 of ΦT1 to read out and hold a reference signal in the first capacitor 21. Thereafter, the photocharges are accumulated in the photodiode 1, and the electric potential appearing at the output terminal Vdi fluctuates in correspondence to a quantity of photocharges. A time interval when the photocharges are accumulated corresponds to a time interval TS1 ranging from a time point of end of the pulse R1 of ΦR up to a time point of end of the pulse S1 of ΦT1. The time interval TS1 is held for all bits.

Next, the second transfer switch 19 is turned ON in accordance with a pulse R1 of ΦT2(n) to read out a reference signal to the second capacitor 22 and the third transfer switch 20 is turned ON in accordance with a pulse R1 of ΦT3(n) to read out a reference signal to the third capacitor 23. The reference signal is held in the capacitor 23 for one period.

Next, an operation for transferring the optical signal in the photoelectric conversion block of an n-th bit will now be described.

At the end of a time interval TS1 for the storage, the first transfer switch 18 is turned ON in accordance with a pulse S1 of ΦT1 to read out an optical signal corresponding to a quantity of electric charges stored in the photodiode to the first capacitor 21. Next, the second transfer switch 19 is turned ON in accordance with a pulse S1 of ΦT2(n) to read out an optical signal to the second capacitor 22. These operations are simultaneously carried out for all bits.

Next, an operation for reading out the reference signal and the optical signal from the photoelectric conversion block of an n-th bit will now be described.

At the time when the channel selection switch 7 is opened in accordance with a pulse of ΦSCH(n) during a time interval TS2 for the storage, the reference signal held in the third capacitor 23 is read out to the common signal line 11. This time interval corresponds to a pulse R1 of ΦSCH(n). This reference signal is a reference signal which is generated in accordance with the pulse R1 of ΦR. Next, at the time when ΦT3(n) is turned ON to read out an optical signal to the capacitor 23 for a time interval S1, this optical signal is read out to the common signal line 11.

At the time when ΦT3(n) is turned ON, the optical signal is read out to the capacitor 23. However, if during the time interval S1 when ΦT3(n) is held in an ON state, a drivability of the amplification unit 17 is set so that the settling for an electric potential appearing at the terminal V1 is obtained, then a time interval of ΦSCH(n) can be shortened, and hence a high speed read operation becomes possible.

From the above-mentioned operation, if there is taken a difference between the output voltage VOUT on the common signal line 11 for the time interval R1 of ΦSCH(n) and the output voltage VOUT on the common signal line 11 for the time interval S1 of ΦSCH(n), then it is possible to remove the fixed pattern noise and the random noise caused by the reset switch 2. This is because both the output voltages contain the same off-noise of the reset pulse ΦR, and output paths of both the output voltages are identical to each other.

Moreover, a reference signal after ΦT3(n) is turned OFF, ΦSCH(n) is turned OFF, the second transfer switch 19 is turned ON in accordance with a pulse R2 of ΦT2(n), and the pulse R2 of the reset pulse signal ΦR comes to an end, is read out to the second capacitor 22. Also, the third transfer switch 20 is turned ON in accordance with a pulse R2 of ΦT3(n) to read out a reference signal to the third capacitor 23.

On the other hand, after ΦSCH(n) is turned OFF, the channel selection switch 7 of the next bit is turned ON in accordance with ΦSCH(n+1) to start an operation for reading out a reference signal of the next bit. A pulse of ΦT2 used to read out a reference signal of an (n+1)-th bit and a pulse of ΦT3 are all shifted backwardly from the pulse of an n-th bit by a time interval when the signal ΦSCH is held in an ON state.

A difference between the reference signal and the optical signal which are read out is taken in a correlation dual sampling circuit or the like. This operation, for example, can be carried out using the circuit of the block C of the prior art example shown in FIG. 16.

In the embodiment shown in FIGS. 8 and 10, when the photodiode is in operation for the storage for a time interval TS2, it is possible to read out the optical signal accumulated for a time interval TS1 of the preceding storage. Consequently, LEDs of three colors R, G and B can be turned ON in sequence to read out color image data. For example, the LED of Red can be turned ON to read out a Red component for the time interval TS1, the LED of Green can be turned ON to read out a Green component for the time interval TS2, and the LED of Blue can be turned ON to read out a Blue component for a time interval following the time interval TS2. In this case, the optical signal of Red is read out within the time interval TS2.

Figure 9:
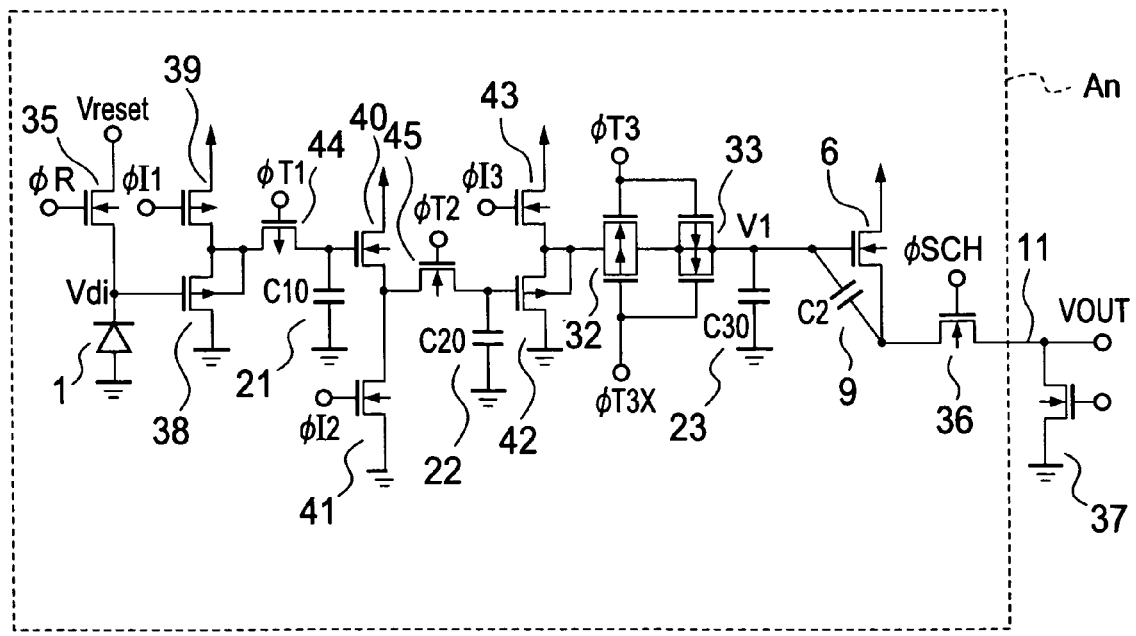
FIG. 9 is a circuit diagram of the batch type photoelectric converter according to the third embodiment of the present invention.

FIG. 9 is a circuit diagram of the batch type photoelectric converter according to the third embodiment of the present invention. The reset switch 2, the amplification units 15, 16 and 17, the transfer switches 18 and 19, the transfer switch 20, the channel selection switch 7, and the first current source 8 shown in FIG. 8 are replaced with a MOS switch 35, MOS source followers 38, 40 and 42 and current sources 39, 41 and 43, MOS switches 44 and 45, a transmission gate 32 and a dummy switch 33, a MOS switch 36, and a MOS current source 37, respectively.

Figure 11:
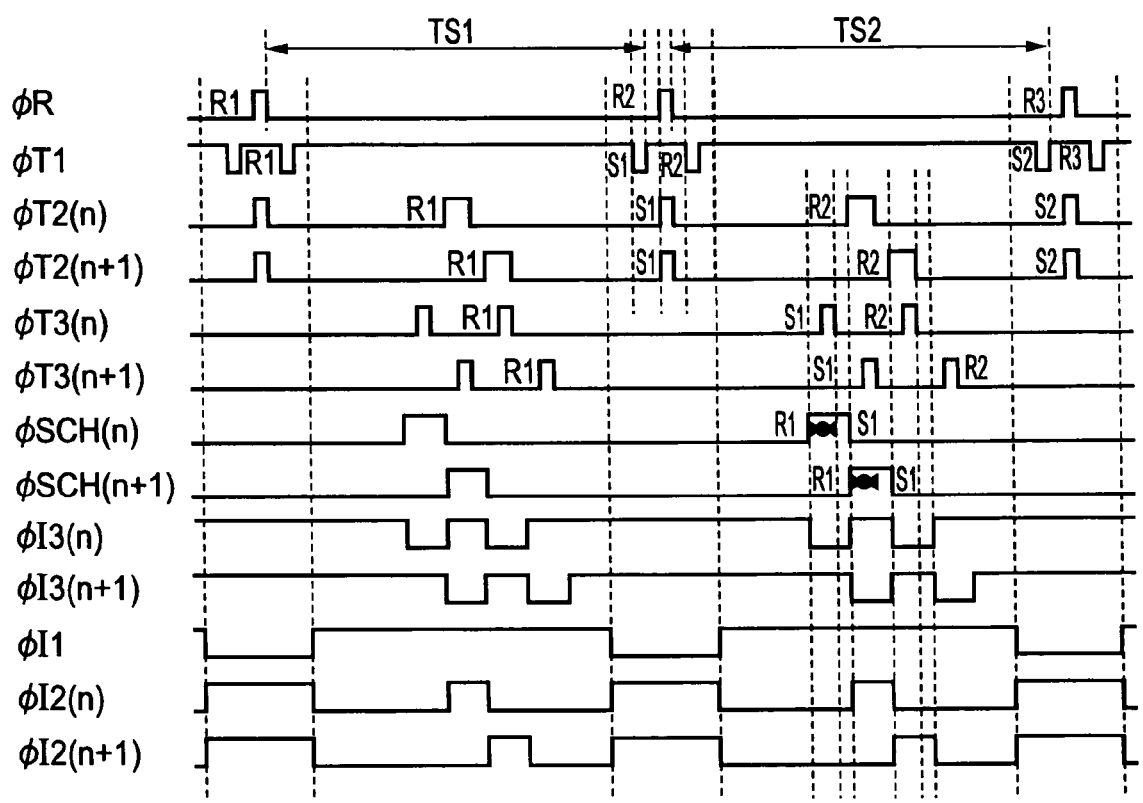
FIG. 11 is a timing chart corresponding to the circuit diagram of the batch type photoelectric converter according to the third embodiment of the present invention.

FIG. 11 is a timing chart corresponding to the circuit diagram of the batch type photoelectric converter according to the third embodiment of the present invention. A point of difference from FIG. 10 is that ΦI1, ΦI2 and ΦI3 are used instead of ΦSEL1, ΦSEL2 and ΦSEL3, respectively. In addition, while not illustrated in FIG. 11, ΦT3X is an inverted signal of ΦT3.

In the circuit shown in FIG. 9, turning ON and OFF of the amplifiers 38, 40 and 42 is controlled in accordance with the gate voltages of the current sources 39, 41 and 43, respectively. Since the substrate electric potentials and the source electric potentials of the MOS source followers 38 and 42 are made common, a gain can be made nearly 1.

In addition, when the reference signal R1 is read out, an electric potential appearing at the terminal V1 and containing the off-noise of ΦT3 is read out, while when the optical signal S1 is read out, an electric potential appearing at the terminal V1 and containing no off-noise of ΦT3 is read out. For this reason, the off-noise component of ΦT3 becomes the dark output offset. In order to reduce the dark output offset, instead of the transfer switch, the transmission gate 32 is used, and the dummy switch 32 is also provided. An NMOS transistor and a PMOS transistor of the transmission gate are made identical in size to each other, and an NMOS transistor and a PMOS transistor of the dummy switch 33 are made half the size of the gate area of the transistors of the transmission gate.

From a viewpoint of the current consumption, the pulse S1 of ΦT3 needs to be shortened to carry out a high speed read operation. In order to attain this, it is necessary to increase the magnitudes of the currents of the amplification unit 14 and the current source 43. In the driving method of FIG. 10 or FIG. 11, since the pulse S1 of ΦT3 is shifted depending on bits, the consumed current can be dispersed. This is shown from the fact that ΦSEL3 of FIG. 10 or ΦI3 of FIG. 11 is shifted every bit. On the other hand, ΦT1 and ΦT2 need to be simultaneously turned ON for all bits. Then, by prolonging a time interval when these signals are held in an ON state, it is possible to suppress the magnitudes of the currents of the amplification units 15, 16 and the current sources 39, 41 to a low level. That is to say, it is sufficient if the ON-time-periods of ΦT1 and ΦT2 shown in FIGS. 10 and 11 are longer than the ON-time-periods of ΦSCH and ΦT3. Though it is shown in FIGS. 10 and 11 that the time interval R2 of ΦT2 is identical to the ON-time-period of ΦSCH, the period R2 of ΦT2 may be longer than the ON-time-period of ΦSCH.

In addition, while the pulse signal such as ΦT2, ΦT3 or ΦSCH needs to be generated so as to be shifted every bit, such a pulse signal may be formed from a pulse of a shift resister.

Fourth Embodiment

Figure 12:
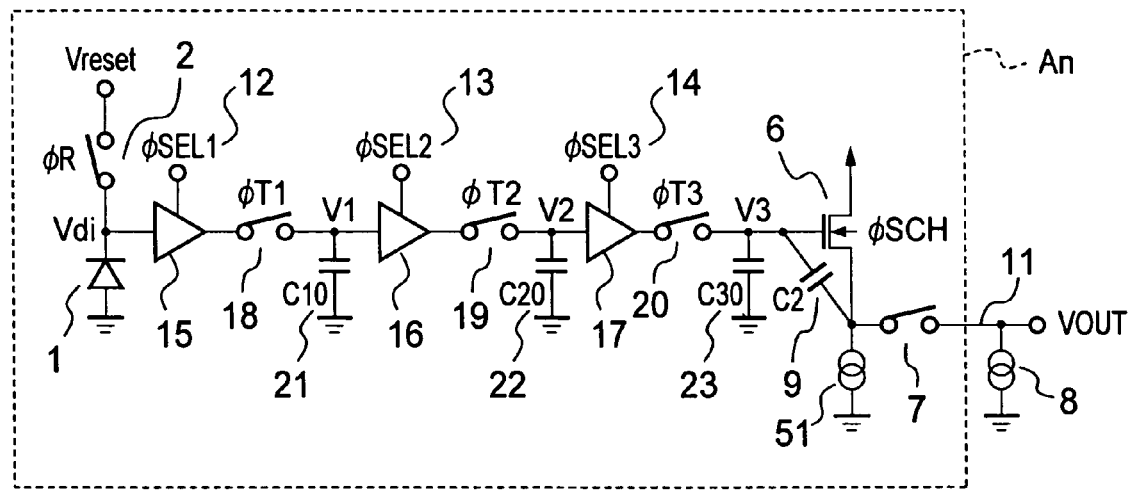
FIG. 12 is a schematic circuit diagram of a batch type photoelectric converter according to a fourth embodiment of the present invention.

FIG. 12 is a schematic circuit diagram of a batch type photoelectric converter according to a fourth embodiment of the present invention. A photoelectric conversion block An shows a photoelectric converter block of an n-th bit. The number of photoelectric conversion blocks is identical to the number of pixels, and the photoelectric conversion blocks are connected to a common signal line 11 through respective channel selection switches 7. A diagram of a configuration of a whole photoelectric converter is shown in FIG. 7.

The circuit of this embodiment includes: the photodiode 1 serving as a photoelectric conversion unit; the transfer switches 18, 19 and 20 each serving as an electric charge transfer unit; the reset switch 2 serving as a reset unit; the amplification units 15, 16 and 17; the capacitors 21, 22 and 23; the MOS transistor 6 constituting a MOS source follower; a second current source connected to a source of the MOS transistor 6; the channel selection switch 7 serving as a channel selection unit; the common signal line 11; and the first current source 8. The amplification units 15, 16 and 17 may be each constituted by a MOS source follower, a voltage follower amplifier or the like, and may also be provided with the amplifier enable terminals 12, 13 and 14 for selection of operation states, respectively. In addition, the parasitic capacitor 9 exists between a gate and a source of the MOS transistor 6.

The second current source is designed to be turned ON and OFF in accordance with an enable signal ΦRR, and in an ON state, substantially the same current as that of the first current source 8 is caused to flow through the second current source.

Figure 14:
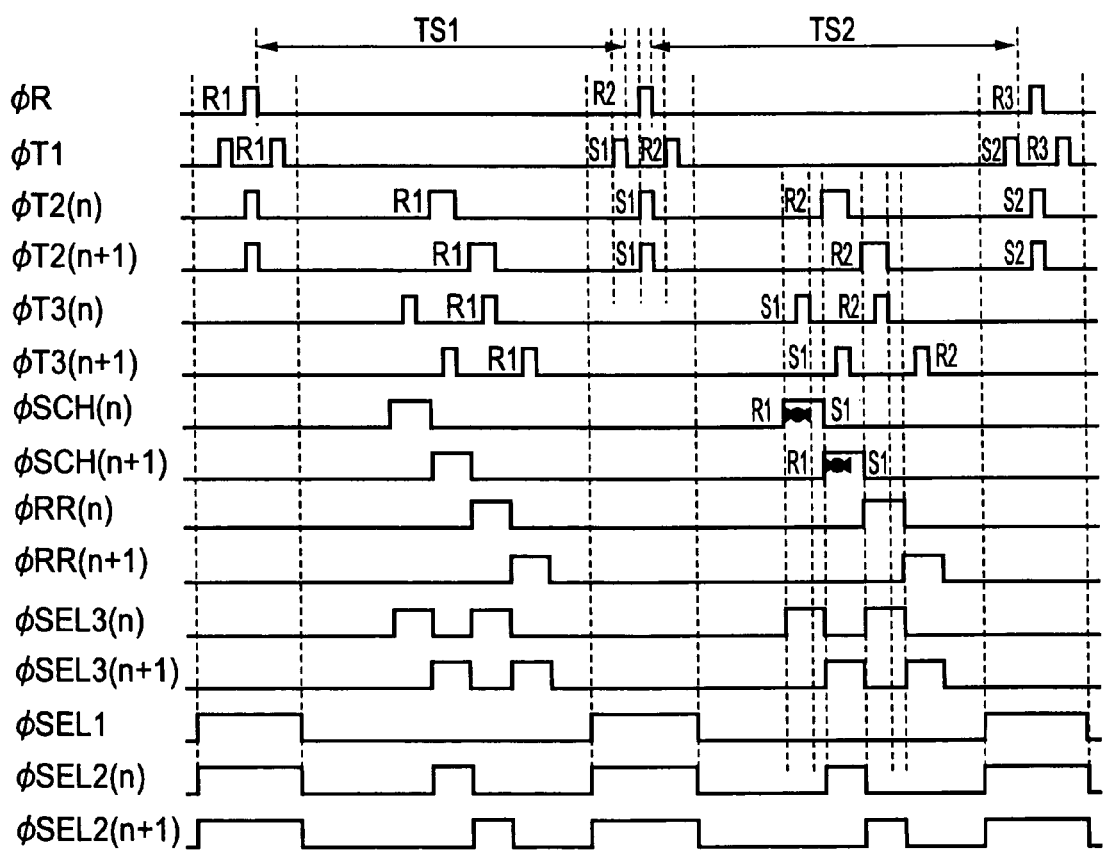
FIG. 14 is a timing chart corresponding to the schematic circuit diagram of the batch type photoelectric converter according to the fourth embodiment of the present invention.

FIG. 14 is a timing chart corresponding to the schematic circuit diagram of the batch type photoelectric converter according to the fourth embodiment of the present invention. ΦR, ΦT1 and ΦSEL1 simultaneously operate for all bits. A time interval S1 of ΦT2 when an optical signal is transferred, and a time interval of ΦSEL2 when an optical signal is transferred are also simultaneously valid for all bits. A time interval R1 of ΦT2 when a reference signal is transferred, a time interval of ΦSEL2 when the reference signal is transferred, and the other pulses are different in operation timing depending on bits. Thus, these signals are denoted with an additional "(n)".

First of all, an operation for transferring the reference signal in the photoelectric conversion block of an n-th bit will hereinafter be described.

At the time when the reset switch 2 is turned ON in accordance with a pulse R1 of ΦR, a voltage appearing at an output terminal Vdi of the photodiode 1 is fixed to a reference voltage Vreset. On the other hand, at the time when the reset switch 2 is turned OFF in accordance with ΦR, the voltage appearing at the output terminal Vdi takes a value obtained by adding an off-noise to the reference voltage Vreset. The off-noise becomes a random noise since an electric potential becomes unstable whenever the reset is carried out. In order to remove an influence of the random noise, it is only necessary to take a difference between an output voltage of the first amplifier 15 after the reset and an output voltage of the first amplifier 15 after the photodiodes subsequently accumulate photocharges.

Then, as shown in FIG. 14, after the reset switch 2 is turned OFF, the first transfer switch 18 is turned ON in accordance with the pulse R1 of ΦT1 to read out and hold a reference signal in the first capacitor 21. Thereafter, the photocharges are accumulated in the photodiode 1, and the electric potential appearing at the output terminal Vdi fluctuates in correspondence to a quantity of photocharges. A time interval when the photocharges are accumulated corresponds to a time interval TS1 ranging from a time point of end of the pulse R1 of ΦR up to a time point of end of the pulse S1 of ΦT1. The time interval TS1 is held for all bits.

Next, the second transfer switch 19 is turned ON in accordance with a pulse R1 of ΦT2(n) to read out a reference signal to the second capacitor 22, and then the third transfer switch 20 is turned ON in accordance with a pulse R1 of ΦT3(n) to read out a reference signal to the third capacitor 23. At this time, the second current source 51 is turned ON in accordance with an enable signal ΦRR(n). The reference signal is held in the capacitor 23 for one period.

Next, an operation for transferring the optical signal in the photoelectric conversion block of an n-th bit will now be described.

At the end of a time interval TS1 for the storage, the first transfer switch 18 is turned ON in accordance with a pulse S1 of ΦT1 to read out an optical signal corresponding to a quantity of electric charges stored in the photodiode to the first capacitor 21. Next, the second transfer switch 19 is turned ON in accordance with a pulse S1 of ΦT2(n) to read out an optical signal to the second capacitor 22. These operations are simultaneously carried out for all bits.

Next, an operation for reading out the reference signal and the optical signal from the photoelectric conversion block of an n-th bit will now be described.

At the time when the channel selection switch 7 is opened in accordance with a pulse of ΦSCH(n) during a time interval TS2 for the storage, the reference signal held in the third capacitor 23 is read out to the common signal line 11. This time interval corresponds to a pulse R1 of ΦSCH(n). This reference signal is a reference signal which is generated in accordance with the pulse R1 of ΦR. Next, at the time when ΦT3(n) is turned ON to read out an optical signal to the capacitor 23 for a time interval S1, this optical signal is read out to the common signal line 11.

At this time, the first current source 8 is turned ON, while the second current source 51 is turned OFF. The first current source 8 and the second current source 51 are designed so as to cause substantially the same ON-current to flow therethrough. Thus, an electric potential appearing at a source electrode of the MOS transistor 6 when the reference signal is read out to the capacitor 23 for a time interval R1 can be made substantially the same as that when the optical signal is read out to the capacitor 23 for a time interval S1. Consequently, it is possible to reduce an influence of the parasitic capacitor 9 on the electric charges accumulated in the capacitor 23, which results in that an offset of a dark output voltage can be made small.

Also, at the time when ΦT3(n) is turned ON, the optical signal is read out to the capacitor 23. However, if during the time interval S1 when ΦT3(n) is held in an ON state, a drivability of the amplification unit 17 is set so that the settling for an electric potential appearing at the terminal V1 is obtained, then a time interval of ΦSCH(n) can be shortened, and hence a high speed read operation becomes possible.

From the above-mentioned operation, if there is taken a difference between the output voltage VOUT on the common signal line 11 for the time interval R1 of ΦSCH(n) and the output voltage VOUT on the common signal line 1 for the time interval S1 of ΦSCH(n), then it is possible to remove the fixed pattern noise and the random noise caused by the reset switch 2. This is because both the output voltages contain the same off-noise of the reset pulse ΦR, and output paths of both the output voltages are identical to each other.

Next, ΦT3(n) is turned OFF, ΦSCH(n) is turned OFF, the second transfer switch 19 is turned ON in accordance with a pulse at a position R2 of ΦT2(n), and then a reference signal after termination of the time interval R2 of the reset pulse ΦR is read out to the second capacitor 22. Next, the third transfer switch 20 is turned ON in accordance with a pulse at a position R2 of ΦT3(n) to read out a reference signal to the third capacitor 23.

On the other hand, after ΦSCH(n) is turned OFF, the channel selection switch 7 of the next bit is turned ON in accordance with ΦSCH(n+1) to start an operation for reading out a reference signal of the next bit. A pulse of ΦT2 used to read out a reference signal of an (n+1)-th bit, a pulse of ΦT3, and a pulse of ΦRR are all shifted backwardly from the pulse of an n-th bit by a time interval when the signal ΦSCH is held in an ON state.

A difference between the reference signal and the optical signal is taken in a correlation dual sampling circuit or the like. This operation, for example, can be carried out using the circuit of the block C of the prior art example shown in FIG. 16.

In the embodiment shown in FIGS. 12 and 14, when the photodiode is in operation for the storage for a time interval TS2, it is possible to read out the optical signal accumulated for a time interval TS1 of the preceding storage. Consequently, LEDs of three colors R, G and B can be turned ON in sequence to read out color image data. For example, the LED of Red can be turned ON to read out a Red component for the time interval TS1, the LED of Green can be turned ON to read out a Green component for the time interval TS2, and the LED of Blue can be turned ON to readout a Blue component for a time interval following the time interval TS2. In this case, the optical signal of Red is read out within the time interval TS2.

Figure 13:
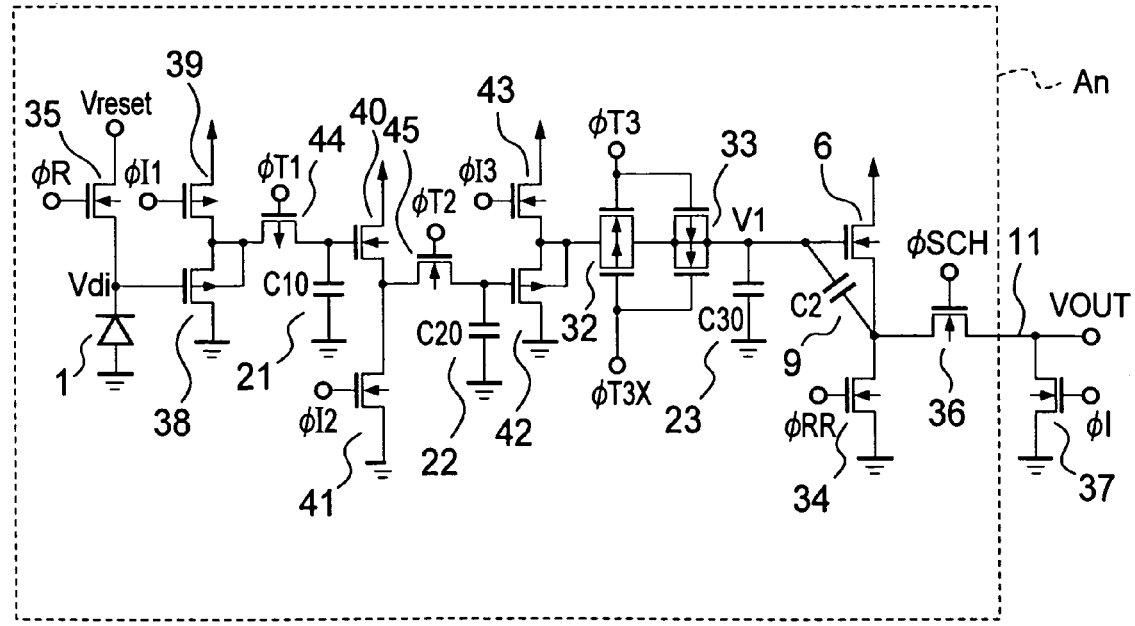
FIG. 13 is a circuit diagram of the batch type photoelectric converter according to the fourth embodiment of the present invention.

FIG. 13 is a circuit diagram of the batch type photoelectric converter according to the fourth embodiment of the present invention. The reset switch 2, the amplification units 15, 16 and 17, the transfer switches 18 and 19, the transfer switch 20, the second current source 51, the channel selection switch 7, and the first current source 8 shown in FIG. 12 are replaced with the MOS switch 35, the MOS source followers 38, 40 and 42 and the current sources 39, 41 and 43, the MOS switches 44 and 45, the transmission gate 32 and the dummy switch 33, the MOS current source 34, the MOS switch 36, and the MOS current source 37, respectively.

Figure 15:
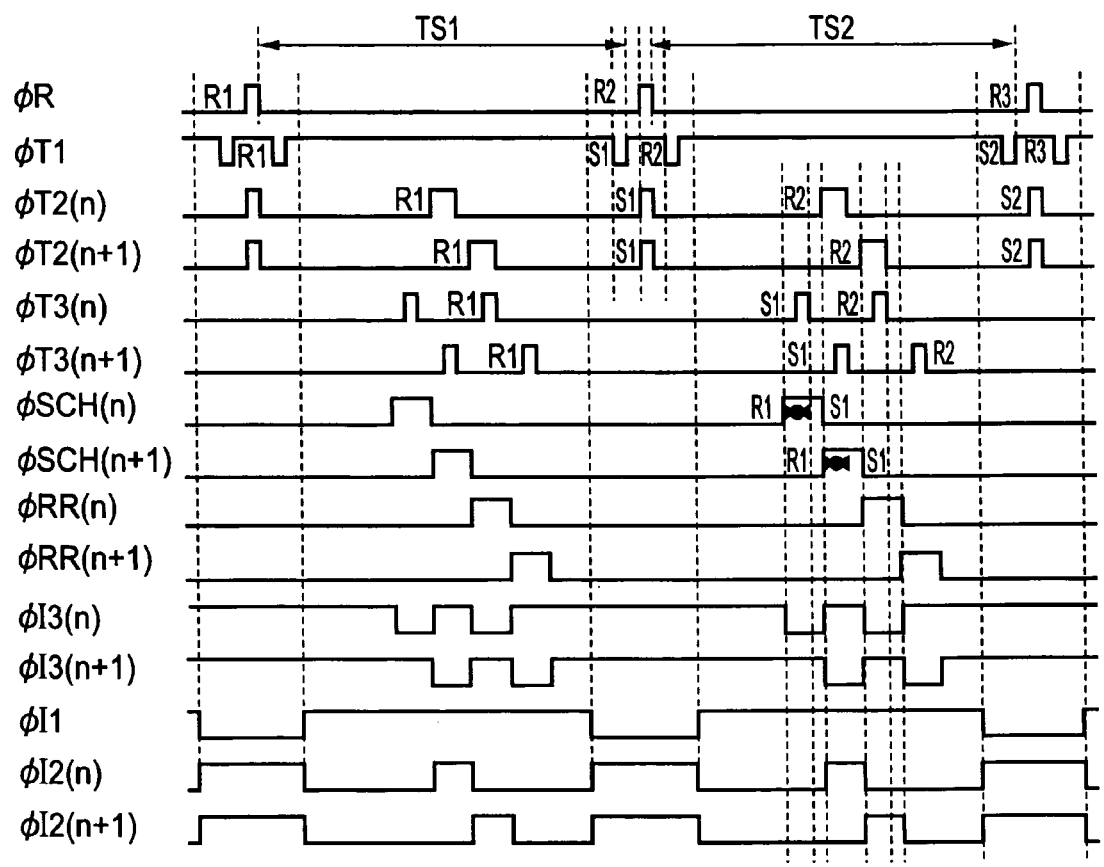
FIG. 15 is a timing chart corresponding to the circuit diagram of the batch type photoelectric converter according to the fourth embodiment of the present invention.

FIG. 15 is a timing chart corresponding to the circuit diagram of the batch type photoelectric converter according to the fourth embodiment of the present invention. A point of difference from FIG. 14 is that ΦI1, ΦI2 and ΦI3 are used instead of ΦSEL1, ΦSEL2 and ΦSEL3, respectively. In addition, while not illustrated in FIG. 15, ΦT3X is an inverted signal of ΦT3.

In the circuit shown in FIG. 13, turning ON and OFF of the amplifiers 38, 40 and 42 is controlled in accordance with the gate voltages of the current sources 39, 41 and 43, respectively. Since the substrate electric potentials and the source electric potentials of the MOS source followers 38 and 42 are made common, a gain can be made nearly 1.

In addition, when the reference signal R1 is read out, an electric potential appearing at the terminal V1 and containing the off-noise of ΦT3 is read out, while when the optical signal S1 is read out, an electric potential appearing at the terminal V1 and containing no off-noise of ΦT3 is read out. For this reason, the off-noise component of ΦT3 becomes the dark output offset. In order to reduce the dark output offset, instead of the transfer switch, the transmission gate 32 is used, and the dummy switch 32 is also provided. An NMOS transistor and a PMOS transistor of the transmission gate are made identical in size to each other, and an NMOS transistor and a PMOS transistor of the dummy switch 33 are made half the size of the gate area of the transistors of the transmission gate.

The MOS current source 34 is held in an OFF state while the enable signal ΦRR is at the GND electric potential, and the MOS current source 34 is held in an ON state while the enable signal ΦRR is at a suitable electric potential. The electric potential of the enable signal ΦRR in the ON state is designed so that a current caused to flow through the MOS current source 34 becomes substantially the same as that caused to flow through the MOS current source 37. For the sake of simplicity, it is also possible that the size of the MOS current source 34 is suitably determined to render an electric potential of the enable signal ΦRR in an ON state to be identical to a power supply voltage. The above-mentioned case is a specific case where the MOS transistor 6, the MOS current source 34 and the MOS current source 37 are each constituted by an NMOS. However, they may also be each constituted by a PMOS.

From a viewpoint of the current consumption, the pulse S1 of ΦT3 needs to be shortened to carry out a high speed read operation. In order to attain this, it is necessary to increase the magnitudes of the currents of the amplification unit 14 and the current source 43. However, in the driving method of FIG. 14 or FIG. 15, since the pulse of ΦT3 is shifted depending on bits, the consumed current can be dispersed. This is shown from the fact that ΦSEL3 of FIG. 14 or ΦI3 of FIG. 15 is shifted every bit. On the other hand, ΦT1 and ΦT2 need to be simultaneously turned ON for all bits. Then, by prolonging a time interval when these signals are held in an ON state, it is possible to suppress the magnitudes of the currents of the amplification units 15, 16 and the current sources 39, 41 to a low level. That is to say, it is sufficient if the ON-time-periods of ΦT1 and ΦT2 shown in FIGS. 14 and 15 are longer than the ON-time-periods of ΦSCH and ΦT3. Though it is shown in FIGS. 14 and 15 that the time interval R2 of ΦT2 is identical to the ON-time-period of ΦSCH, the period R2 of ΦT2 may be longer than the ON-time-period of ΦSCH.

In addition, while the pulse signal such as ΦT2, ΦT3, ΦSCH, or ΦRR needs to be generated so as to be shifted every bit, such a pulse signal may be formed from a pulse of a shift resister.

The present invention is not intended to be limited to the preferred embodiments described above, and hence various changes may be made without departing from the subject matter of the invention.

The above-mentioned circuit may be formed in the form of a linear image sensor IC on one semiconductor substrate.

In addition, a plurality of linear image sensor ICs may be linearly mounted to provide a close contact type image sensor.

The present invention can be utilized in a linear image sensor IC applied to an image reading device such as a facsimile or an image scanner, and a close contact type image sensor in which a plurality of image sensor ICs are mounted. In addition, the invention can be applied to an area image sensor IC.

What is claimed is:

1. A photoelectric converter, comprising:
   a photoelectric conversion circuit for generating an optical signal in correspondence to incident light;
   a reset circuit connected to an output terminal of the photoelectric conversion circuit;
   an amplification circuit connected to output terminals of the photoelectric conversion circuit and the reset circuit;
   an electric charge transfer unit having a terminal connected to an output terminal of the amplification circuit;
   a capacitor connected to the other terminal of the electric charge transfer unit;
   a source follower amplifier having a gate connected to the electric charge transfer unit and the capacitor;
   a channel selection circuit connected to a source of the source follower amplifier;
   a common signal line to which an output terminal of the channel selection circuit is connected;
   a first current source connected to the common signal line; and
   a second current source connected to the source of the source follower amplifier;
   wherein the capacitor holds a reference signal generated through resetting of the photoelectric conversion circuit by the reset circuit, and when the channel selection circuit is turned ON, the reference signal is read out from the capacitor to the common signal line, and then the electric charge transfer unit is turned ON to read out the optical signal to the common signal line.

2. A photoelectric converter according to claim 1; wherein after the reference signal and the optical signal are read out to the common signal line, the channel selection circuit is turned OFF, and the electric charge transfer unit is turned ON to read out to the capacitor a reference signal generated through resetting of the photoelectric conversion circuit by the reset circuit.

3. A photoelectric converter according to claim 1; wherein while the channel selection circuit is held in an ON state, the first current source is turned ON to cause a current to flow, and when the electric charge transfer unit is turned ON to read out the reference signal to the capacitor, the second current source is turned ON to cause a current to flow.

4. A photoelectric converter according to claim 1; wherein the current caused to flow through the second current source is substantially the same as that caused to flow through the first current source.

5. A photoelectric converter according to claim 1; wherein the first and second current sources are constituted by MOS transistors, respectively, and drains of the MOS transistors are connected to a source of the source follower amplifier, and control for turning ON and OFF of the first and second current sources is carried out by changing gate voltages of the MOS transistors.

* * * * *